(12) United States Patent
Liang et al.

(10) Patent No.: US 12,483,952 B2
(45) Date of Patent: Nov. 25, 2025

(54) RELAY RESELECTION METHOD, DEVICE, AND MEDIUM

(71) Applicant: VIVO MOBILE COMMUNICATION CO., LTD., Guangdong (CN)

(72) Inventors: Jing Liang, Guangdong (CN); Xiaodong Yang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 421 days.

(21) Appl. No.: 17/669,483

(22) Filed: Feb. 11, 2022

(65) Prior Publication Data
US 2022/0167240 A1 May 26, 2022

Related U.S. Application Data

(63) Continuation of application No. PCT/CN2020/109208, filed on Aug. 14, 2020.

(30) Foreign Application Priority Data

Aug. 15, 2019 (CN) .......................... 201910754814.7

(51) Int. Cl.
*H04W 36/00* (2009.01)
*H04W 36/24* (2009.01)
*H04W 36/30* (2009.01)

(52) U.S. Cl.
CPC .......... *H04W 36/033* (2023.05); *H04W 36/24* (2013.01); *H04W 36/304* (2023.05)

(58) Field of Classification Search
CPC ..... H04W 36/30; H04W 36/03; H04W 36/24; H04W 40/06; H04W 40/12; H04W 40/34; H04W 88/04; H04W 40/22; H04W 24/08; Y02D 30/70
See application file for complete search history.

(56) References Cited

U.S. PATENT DOCUMENTS

| | | | |
|---|---|---|---|
| 10,136,372 B2* | 11/2018 | Jung | H04B 17/327 |
| 2017/0244468 A1 | 8/2017 | Zhao | |
| 2017/0347338 A1 | 11/2017 | Chen et al. | |
| 2018/0070281 A1* | 3/2018 | Wu | H04W 48/20 |
| 2018/0092017 A1 | 3/2018 | Freda et al. | |
| 2018/0139682 A1 | 5/2018 | Xu et al. | |
| 2018/0152986 A1 | 5/2018 | Jung et al. | |
| 2018/0160287 A1* | 6/2018 | Wu | H04B 7/15507 |
| 2018/0343598 A1* | 11/2018 | Xu | H04W 36/033 |

(Continued)

FOREIGN PATENT DOCUMENTS

| | | |
|---|---|---|
| CN | 105451282 A | 3/2016 |
| CN | 106211026 A | 12/2016 |

(Continued)

OTHER PUBLICATIONS

Fujitsu et al. (Discussion on trigger condition for relay reselection, R2-154307, May 2015).*

(Continued)

*Primary Examiner* — Lakeram Jangbahadur
(74) *Attorney, Agent, or Firm* — Price Heneveld LLP (57) ABSTRACT

Embodiments of this disclosure provide a relay reselection method, a device, and a medium. The method includes: performing a corresponding relay reselection operation in a case that a first relay reselection condition is met.

14 Claims, 2 Drawing Sheets

```
┌──────────────────────────────────────┐
│ Detect whether a first relay         │  ── S101
│ reselection condition is met         │
└──────────────────────────────────────┘
                  │
               If met
                  ▼
┌──────────────────────────────────────┐
│ Perform a corresponding relay        │  ── S102
│ reselection operation                │
└──────────────────────────────────────┘
```

(56) References Cited

U.S. PATENT DOCUMENTS

| | | | |
|---|---|---|---|
| 2019/0037423 A1 | 1/2019 | Yu et al. | |
| 2019/0082496 A1 | 3/2019 | Yi et al. | |
| 2019/0141771 A1 | 5/2019 | Ma et al. | |
| 2019/0207705 A1 | 7/2019 | Zhou et al. | |
| 2019/0245737 A1 | 8/2019 | Zhou et al. | |
| 2019/0313315 A1 | 10/2019 | Xu et al. | |
| 2021/0037438 A1* | 2/2021 | Uchiyama | H04W 40/22 |

FOREIGN PATENT DOCUMENTS

| | | | | |
|---|---|---|---|---|
| CN | 106686674 A | | 5/2017 | |
| CN | 106888494 A | | 6/2017 | |
| CN | 107342801 A | | 11/2017 | |
| CN | 108632919 A | | 10/2018 | |
| CN | 108924962 A | | 11/2018 | |
| CN | 109328483 A | | 2/2019 | |
| JP | 2018515969 A | | 6/2018 | |
| KR | 20160138928 A | * | 5/2016 | H04W 76/38 |
| WO | 2016164808 A1 | | 10/2016 | |
| WO | 2016179832 A1 | | 11/2016 | |
| WO | 2016183710 A1 | | 11/2016 | |
| WO | 2018016882 A1 | | 1/2018 | |

OTHER PUBLICATIONS

Intel (Radio link monitoring, beam failure and radio link failure, R2-1703423, Apr. 2017).*

LG (Relay reselection procedure for remote UE, R2-1703329, Apr. 2017).*

Intel Corp., "Radio link monitoring, beam failure and radio link failure", 3GPP TSG RAN WG2#97bis, R2-1703423, Spokane, USA, Apr. 3-7, 2017.

LG Electronics Inc., "Relay reselection procedure for remote UE", 3GPP TSG-RAN WG2 Meeting #97bis, R2-1703329, Spokane, Washington, USA, Apr. 3-7, 2017.

Fujitsu Limited, "Discussion on trigger condition for relay reselection", 3GPP TSG-RAN WG2 Meeting#91bis, R2-154307, Malmo, Sweden, Oct. 5-9, 2015.

Fujitsu, "Considerations on trigger condition for relay reselection", 3GPP TSG-RAN WG2 Meeting#91, R2-153106, Beijing, China, Aug. 24-28, 2015.

Huawei, Hisilicon, "Beamforming for V2X sidelink for FR1 and FR2", R1-1903075, 3GPP TSG RAN WG1 Meeting #96, Feb. 25-Mar. 1, 2019, Athens, Greece.

Interdigital Communications, "On Relay Selection/Reselection for UE-to-Network Relays", R2-152680, 3GPP TSG-RAN WG2 #90, May 25-29, 2015, Fukuoka, Japan.

Potevio, "Discussion on relay UE selection/re-selection", R2-153472, 3GPP Tsg-Ran WG2 #91, Aug. 24 - 28, 2015, Beijing, ,China.

ITL, "Considerations on PC5 link release for multiple remote UEs", R2-156321, 3GPP TSG RAN WG2 Meeting #92, Nov. 16-20, 2015, Anaheim, California, USA.

Huawei, Hisilicon, "Further discussion on the paging receiving via Relay UE", R2-1703470, 3GPP TSG-RAN WG2 Meeting #97bis, Apr. 3-7, 2017, Spokane, Washington, USA.

Huawei, Hisilicon, "Beamforming for V2X sidelink for FR1 and FR2", 3GPP TSG RAN WG1 Ad-Hoc Meeting 1901, R1-1900862, Taipei, Jan. 21-25, 2019.

* cited by examiner

RELAY RESELECTION METHOD, DEVICE, AND MEDIUM

CROSS-REFERENCE TO RELATED APPLICATIONS

The present application is a bypass continuation application of International Application No. PCT/CN2020/109208 filed on Aug. 14, 2020, which claims priority to Chinese Patent Application No. 201910754814.7 filed in China on Aug. 15, 2019, which are incorporated herein by reference in their entireties.

TECHNICAL FIELD

This disclosure relates to the field of communications technologies, and in particular, to a relay reselection method, a device, and a medium.

BACKGROUND

Relay technology in wireless communications systems means addition of one or more relay devices between a base station and a terminal device for forwarding a radio signal one or more times. In other words, the radio signal passes through multiple hops before reaching the terminal device.

The wireless relay technology can be used to expand cell coverage to make up for blind spots in cell coverage, and also increase a cell capacity through spatial resource multiplexing. For indoor coverage, the relay technology can also overcome penetration loss and improve the quality of indoor coverage.

Using a simple one-hop relay as an example, wireless relay divides a link between a base station and a terminal device into two links: one between the base station and a relay device and the other between the relay device and the terminal device, offering an opportunity to replace one poor-quality link with two better-quality links to obtain a larger link capacity and better coverage.

In the existing UE-to-network relay technology, one end of a relay device is connected to a terminal device and the other end is connected to a network-side device. The terminal device connected to the relay device is referred to as a remote terminal device.

Currently, when the remote terminal device detects that a measurement result of sidelink discovery reference signal received power (SD-RSRP) is less than a given threshold, relay reselection is performed.

SUMMARY

Embodiments of this disclosure provide a relay reselection method, a device, and a medium, so as to implement relay reselection.

According to a first aspect, an embodiment of this disclosure provides a relay reselection method, applied to a first device. The method includes:
  performing a corresponding relay reselection operation in a case that a first relay reselection condition is met.

According to a second aspect, an embodiment of this disclosure provides a relay device, including:
  a first relay reselection module, configured to perform a corresponding relay reselection operation in a case that a first relay reselection condition is met.

According to a third aspect, an embodiment of this disclosure provides a remote terminal device, including:
  a second relay reselection module, configured to perform a corresponding relay reselection operation in a case that a first relay reselection condition is met.

According to a fourth aspect, an embodiment of this disclosure provides a relay device, including a memory, a processor, and a computer program that is stored in the memory and capable of running on the processor, where
  when the processor executes the computer program, the relay reselection method applied to the relay device provided in the embodiments of this disclosure is implemented.

According to a fifth aspect, an embodiment of this disclosure provides a remote terminal device, including a memory, a processor, and a computer program that is stored in the memory and capable of running on the processor, where
  when the processor executes the computer program, the relay reselection method applied to the remote terminal device provided in the embodiments of this disclosure is implemented.

According to a sixth aspect, an embodiment of this disclosure provides a computer-readable storage medium, where the computer-readable storage medium stores a computer program, and when the computer program is executed by a processor, the relay reselection method is implemented.

According to the relay reselection method, the device, and the medium provided in the embodiments of this disclosure, relay reselection can be implemented, so that the remote terminal device is able to communicate with other remote terminal devices and/or base stations based on a relay device used after the relay reselection, thereby improving communication efficiency of the remote terminal device.

BRIEF DESCRIPTION OF DRAWINGS

To describe the technical solutions in embodiments of this disclosure more clearly, the following briefly describes the accompanying drawings required for describing the embodiments of this disclosure. A person of ordinary skill in the art may derive other drawings from these accompanying drawings without creative efforts.

DETAILED DESCRIPTION OF EMBODIMENTS

To make the objectives, technical solutions, and beneficial technical effects of this disclosure clearer, this disclosure is described below in detail with reference to specific embodiments. It should be understood that the embodiments described in this specification are merely intended to explain this disclosure, but not to limit this disclosure.

For brevity, this specification merely explicitly discloses some numerical ranges. However, any lower limit may be combined with any upper limit to form an unspecified range, and any lower limit may be combined with another lower limit to form an unspecified range, and likewise, any upper limit may be combined with any other upper limit to form an unspecified range. In addition, although not explicitly stated, every point or single numerical value between end points of a range is included in the range. Therefore, each point or single numerical value, as a lower limit or an upper limit, may be combined with any other point or single numerical value or combined with another lower limit or upper limit to form an unspecified stated range.

In the descriptions of this specification, it should be noted that "more than" or "less than" is inclusive of the present number and that "more" in "one or more" means two or more than two, unless otherwise specified.

The summary of this disclosure is not intended to describe each disclosed embodiment or every implementation in this disclosure. The following description more specifically describes exemplary embodiments. In many places throughout the application, guidance is provided through a series of embodiments, and these embodiments can be used in various combinations. In each embodiment, examples are merely some and should not be understood as all the examples of the embodiment.

Figure 1:
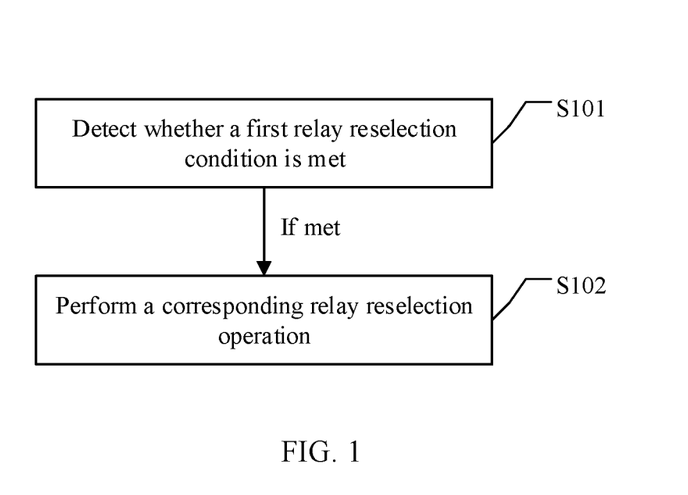
FIG. 1 is a schematic flowchart of a relay reselection method applied to a first device according to an embodiment of this disclosure.

FIG. 1 is a schematic flowchart of a relay reselection method applied to a first device according to an embodiment of this disclosure. The relay reselection method applied to the first device may include the following steps.

S101: Detect whether a first relay reselection condition is met, and perform S102 if the first relay reselection condition is met.

S102: Perform a corresponding relay reselection operation.

In an embodiment of this disclosure, the corresponding relay reselection operation in S102 means a relay reselection operation corresponding to the first device.

In an embodiment of this disclosure, the first device may be a relay device with one end connected to a terminal device and the other end connected to a network-side device in UE-to-network relay technology, or may be a relay device with each end connected to a terminal device in UE-to-UE relay technology.

In an embodiment of this disclosure, the first device may alternatively be a remote terminal device.

The relay device in this embodiment of this disclosure means a device that serves as a remote terminal device to communicate with other remote terminal devices or network-side devices; and the remote terminal device means a device that needs to communicate with other remote terminal devices or network-side devices through the relay device.

The network-side device provided in the embodiments of this disclosure may be a base station, where the base station may be a commonly used base station, or may be an evolved node base station (eNB), or may be a network-side device (for example, a next generation node base station (next generation node base station, gNB) or a transmission and reception point (transmission and reception point, TRP)), a cell, or the like in a 5G system, or a network-side device in a later evolved communications system. However, the terms do not constitute a limitation on the protection scope of this disclosure.

When the first device is a relay device, the performing, by the relay device, a corresponding relay reselection operation means: notifying a remote terminal device to perform relay reselection.

In an embodiment of this disclosure, the notifying, by the relay device, a remote terminal device to perform relay reselection may include at least one of the following:
transmitting, to the remote terminal device, a radio resource control (RRC) message for instructing the remote terminal device to perform relay reselection;
transmitting no reference signal for radio link monitoring (RLM) on a communication link with the remote terminal device;
transmitting no service data on a communication link with the remote terminal device; transmitting no feedback message on a communication link with the remote terminal device; and
transmitting no sidelink discovery signal on a communication link with the remote terminal device.

In an embodiment of this disclosure, the radio resource control message may be a radio resource control release message, may be a radio resource control reconfiguration message, may be a radio resource control connection establishment reject message, or may be other radio resource control messages than the above three types of radio resource control messages.

In an embodiment of this disclosure, the radio resource control message may include: second indication information, where the second indication information is used to indicate a relay reselection condition satisfied by the relay device. For example, the relay device detects a radio link failure on a communication link.

The first relay reselection condition provided in the embodiments of this disclosure may include at least one of the following:
the relay device having detected a beam failure on a communication link;
the relay device having detected a radio link failure on a communication link;
the relay device having performed a radio resource control connection reestablishment on a communication link between the relay device and a network-side device;
the relay device having been switched on a communication link between the relay device and the network-side device;
the relay device having received first indication information transmitted by the network-side device, where the first indication information is used to indicate the relay device to perform the corresponding relay reselection operation; and
the relay device having not satisfied a first condition, where the first condition is a condition for serving as a relay.

In an embodiment of this disclosure, the first condition may include:
at least one beam measurement result measured by the relay device in a serving cell being greater than a first preset beam measurement result; and/or at least one beam measurement result measured by the relay device in a serving cell being smaller than a second preset beam measurement result.

The serving cell may be a primary serving cell or a secondary serving cell.

In an embodiment of this disclosure, the relay device having detected a beam failure on a communication link may include: the relay device having detected a beam failure on a communication link between the relay device and the remote terminal device; and/or the relay device having detected a beam failure on a communication link between the relay device and the network-side device.

In an embodiment of this disclosure, the communication link between the relay device and the remote terminal device may be a PC5 link, and the communication link between the relay device and the network-side device may be a Uu link.

In an embodiment of this disclosure, the relay device having detected a radio link failure on a communication link may include: the relay device having detected a radio link failure on a communication link between the relay device and the remote terminal device; and/or the relay device having detected a radio link failure on a communication link between the relay device and the network-side device.

In an embodiment of this disclosure, a plurality of manners may be used for having detected a radio link failure on a communication link between the relay device and the remote terminal device. For example, the relay device receives a radio link failure indication transmitted by the remote terminal device; for another example, the relay device triggers a radio link failure through a radio link monitoring procedure, for example, a timer related to radio link monitoring or a radio link failure expires; for another example, the relay device does not receive a feedback message or service data from the remote terminal device within a given period of time; for another example, the number of retransmissions of the relay device at a media access control (MAC) layer or a radio link control (RLC) layer exceeds a preset number of retransmissions.

In an embodiment of this disclosure, when the first relay reselection condition includes the relay device having detected a beam failure on a communication link, the first relay reselection condition may also include at least one of the following:
  a beam failure recovery timer started by the relay device having expired;
  a random access procedure for beam failure recovery triggered by the relay device having failed;
  the relay device having started a beam failure recovery timer;
  the relay device having triggered a random access procedure for beam failure recovery;
  the relay device having started a beam failure detection timer;
  a beam failure detection timer started by the relay device having expired; and
  a count value of a beam failure instance counter being greater than a preset count value.

In an embodiment of this disclosure, a communication link may be the same as a beam-related counter or timer used by the communication link.

In an embodiment of this disclosure, a communication link may not be the same as a beam-related counter or timer used by the communication link, that is, the communication link is independent of the beam-related counter or timer used by the communication link.

In an embodiment of this disclosure, when the first relay reselection condition includes the relay device having detected a radio link failure on a communication link, the first relay reselection condition may further include:
  a T310 timer being running; and/or the T310 timer having expired.

According to the relay reselection method provided in this embodiment of this disclosure, the relay device can trigger relay reselection of a remote terminal device, enabling the remote terminal device to perform relay reselection based on a notification of the relay device, so that the remote terminal device can communicate with other remote terminal devices and/or base stations based on a relay device used after the relay reselection, thereby improving communication efficiency of the remote terminal device.

When the first device is a remote terminal device, the performing, by the remote terminal device, a corresponding relay reselection operation means: performing, by the remote terminal device, relay reselection.

In an embodiment of this disclosure, the first relay reselection condition provided in the embodiments of this disclosure may include at least one of the following:
  the remote terminal device having detected a beam failure on a communication link between the remote terminal device and a relay device;
  the remote terminal device having detected a radio link failure on a communication link between the remote terminal device and the relay device;
  the remote terminal device having received a radio resource control message transmitted by the relay device to indicate performing relay reselection;
  the remote terminal device having received no reference signal for radio link monitoring from the relay device within preset first duration;
  the remote terminal device having received no service data from the relay device within preset second duration;
  the remote terminal device having received no feedback message from the relay device within preset third duration; and
  the remote terminal device having received no sidelink discovery signal from the relay device within preset fourth duration.

In an embodiment of this disclosure, the preset first duration, the preset second duration, the preset third duration, and the preset fourth duration may be the same or different.

A plurality of manners may be used for detecting a radio link failure on a communication link between the remote terminal device and the relay device. For example, the remote terminal device receives a radio link failure indication transmitted by the relay device; for another example, the remote terminal device triggers a radio link failure through a radio link monitoring procedure, for example, a timer related to radio link monitoring or a radio link failure expires; for another example, the remote terminal device does not receive a feedback message or service data from the relay device within a given period of time; for another example, the number of retransmissions of the remote terminal device at a MAC layer or an RLC layer exceeds a preset number of retransmissions; for another example, the remote terminal device does not receive a sidelink discovery signal from the relay device within a given period of time.

In an embodiment of this disclosure, the radio resource control message may be a radio resource control release message, may be a radio resource control reconfiguration message, may be a radio resource control connection establishment reject message, or may be other radio resource control messages than the above three types of radio resource control messages.

In an embodiment of this disclosure, the radio resource control message may include: third indication information, where the third indication information is used to indicate a relay reselection condition satisfied by the relay device. For example, the relay device detects a radio link failure on a communication link.

According to the relay reselection method provided in this embodiment of this disclosure, the remote terminal device can perform relay reselection based on the first relay reselection condition, so that the remote terminal device can communicate with other remote terminal devices and/or base stations based on a relay device used after the relay reselection, thereby improving communication efficiency of the remote terminal device.

Figure 2:
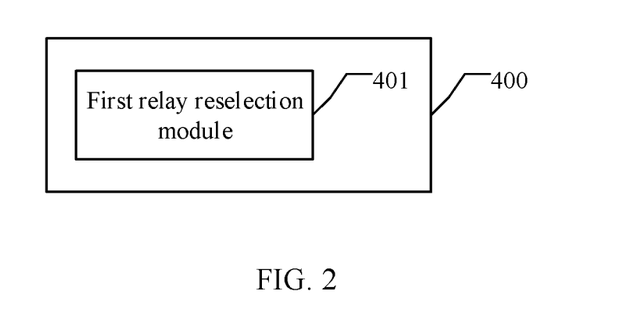
FIG. 2 is a schematic structural diagram of a relay device according to an embodiment of this disclosure.

An embodiment of this disclosure further provides a relay device. FIG. 2 is a schematic structural diagram of a relay device according to an embodiment of this disclosure. The relay device 400 may include:

a first relay reselection module 401, configured to perform a corresponding relay reselection operation in a case that a first relay reselection condition is met.

In an embodiment of this disclosure, the first relay reselection module 401 may be specifically configured to:

in a case that the first relay reselection condition is met, notify a remote terminal device to perform relay reselection.

In an embodiment of this disclosure, the first relay reselection module 401 may be specifically configured to perform at least one of the following:

transmitting, to the remote terminal device, a radio resource control message for instructing the remote terminal device to perform relay reselection;

transmitting no reference signal for radio link monitoring on a communication link with the remote terminal device;

transmitting no service data on a communication link with the remote terminal device;

transmitting no feedback message on a communication link with the remote terminal device; and transmitting no sidelink discovery signal on a communication link with the remote terminal device.

In an embodiment of this disclosure, the first relay reselection condition may include at least one of the following:

the relay device having detected a beam failure on a communication link;

the relay device having detected a radio link failure on a communication link;

the relay device having performed a radio resource control connection reestablishment on a communication link between the relay device and a network-side device;

the relay device having been switched on a communication link between the relay device and the network-side device;

the relay device having received first indication information transmitted by the network-side device, where the first indication information may be used to indicate the relay device to perform the corresponding relay reselection operation; and the relay device having not satisfied a first condition, where the first condition is a condition for serving as a relay.

In an embodiment of this disclosure, the first condition may include:

at least one beam measurement result measured by the relay device in a serving cell being greater than a first preset beam measurement result; and/or at least one beam measurement result measured by the relay device in a serving cell being smaller than a second preset beam measurement result.

In an embodiment of this disclosure, the relay device having detected a beam failure on a communication link may include:

the relay device having detected a beam failure on a communication link between the relay device and the remote terminal device; and/or the relay device having detected a beam failure on a communication link between the relay device and the network-side device.

In an embodiment of this disclosure, the relay device detecting a radio link failure on a communication link may include:

the relay device having detected a radio link failure on a communication link between the relay device and the remote terminal device; and/or the relay device having detected a radio link failure on a communication link between the relay device and the network-side device.

In an embodiment of this disclosure, the first relay reselection condition includes: the relay device having detected a beam failure on a communication link; and the first relay reselection condition may also include at least one of the following:

a beam failure recovery timer started by the relay device having expired;

a random access procedure for beam failure recovery triggered by the relay device having failed;

the relay device having started a beam failure recovery timer;

the relay device having triggered a random access procedure for beam failure recovery;

the relay device having started a beam failure detection timer;

a beam failure detection timer started by the relay device having expired; and a count value of a beam failure instance counter being greater than a preset count value.

In an embodiment of this disclosure, the radio resource control message may include at least one of the following:

a radio resource control release message, a radio resource control reconfiguration message, a radio resource control connection establishment reject message, and other radio resource control messages than the above three types of radio resource control messages.

In an embodiment of this disclosure, the radio resource control message may include:

second indication information, where the second indication information may be used to indicate a relay reselection condition satisfied by the relay device.

In an embodiment of this disclosure, the second indication information may be in a cause value of the radio resource control message.

Figure 3:
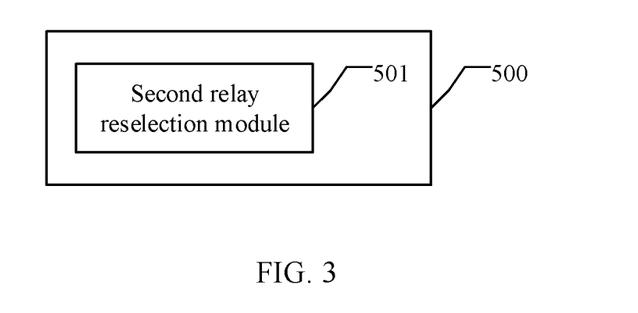
FIG. 3 is a schematic structural diagram of a remote terminal device according to an embodiment of this disclosure.

An embodiment of this disclosure further provides a remote terminal device. FIG. 3 is a schematic structural diagram of a remote terminal device according to an embodiment of this disclosure. The remote terminal device 500 may include:

a second relay reselection module 501, configured to perform a corresponding relay reselection operation in a case that a first relay reselection condition is met.

In an embodiment of this disclosure, the second relay reselection module 501 may be specifically configured to:

perform relay reselection in a case that the first relay reselection condition is met.

In an embodiment of this disclosure, the first relay reselection condition may include at least one of the following:

the remote terminal device having detected a beam failure on a communication link between the remote terminal device and a relay device;

the remote terminal device having detected a radio link failure on a communication link between the remote terminal device and the relay device;

the remote terminal device having received a radio resource control message transmitted by the relay device to indicate performing relay reselection;

the remote terminal device having received no reference signal for radio link monitoring from the relay device within preset first duration;

the remote terminal device having received no service data from the relay device within preset second duration;

the remote terminal device having received no feedback message from the relay device within preset third duration; and the remote terminal device having received no sidelink discovery signal from the relay device within preset fourth duration.

In an embodiment of this disclosure, the radio resource control message may include at least one of the following:

a radio resource control release message, a radio resource control reconfiguration message, a radio resource control connection establishment reject message, and other radio resource control messages than the above three types of radio resource control messages.

In an embodiment of this disclosure, the radio resource control message may include:

third indication information, where the third indication information may be used to indicate a relay reselection condition satisfied by the relay device.

Figure 4:
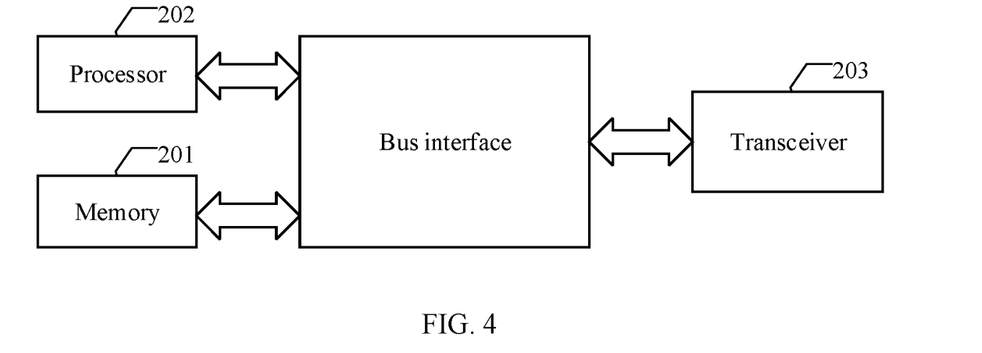
FIG. 4 is a schematic structural diagram of hardware of a relay device according to an embodiment of this disclosure.

FIG. 4 is a schematic structural diagram of hardware of a relay device according to an embodiment of this disclosure. The relay device may include a memory 201, a processor 202, a transceiver 203, and a computer program that is stored in the memory 201 and capable of running on the processor 202.

The processor 202 may be configured to perform a corresponding relay reselection operation in a case that a first relay reselection condition is met.

A process in which the processor 202 performs the corresponding relay reselection operation is basically the same as the process in which the relay device performs the corresponding relay reselection operation in the foregoing method embodiment. For details, refer to the description in the foregoing method embodiment. Details are not described again in this embodiment of this disclosure.

In FIG. 4, a bus architecture may include any quantity of interconnected buses and bridges, and specifically connect together various circuits of one or more processors represented by the processor 202 and a memory represented by the memory 201. The bus architecture may further interconnect various other circuits such as a peripheral device, a voltage regulator, and a power management circuit. These are all well known in the art, and therefore are not further described in this specification. The bus interface provides an interface. The transceiver 203 may be a plurality of elements, including a transmitter and a receiver, provides units configured to perform communication with various other apparatuses over a transmission medium, and is configured to receive and send data under control of the processor 202. The processor 202 is responsible for bus architecture management and general processing. The memory 201 may store data used when the processor 202 performs an operation.

Optionally, an embodiment of this disclosure further provides a relay device, including a processor 202, a memory 201, and a computer program that is stored in the memory 201 and capable of running on the processor 202. When the computer program is executed by the processor 202, the processes of the foregoing relay reselection method embodiments applied to the relay device provided in the embodiment of this disclosure are implemented, with the same technical effects achieved. To avoid repetition, details are not described herein again.

Figure 5:
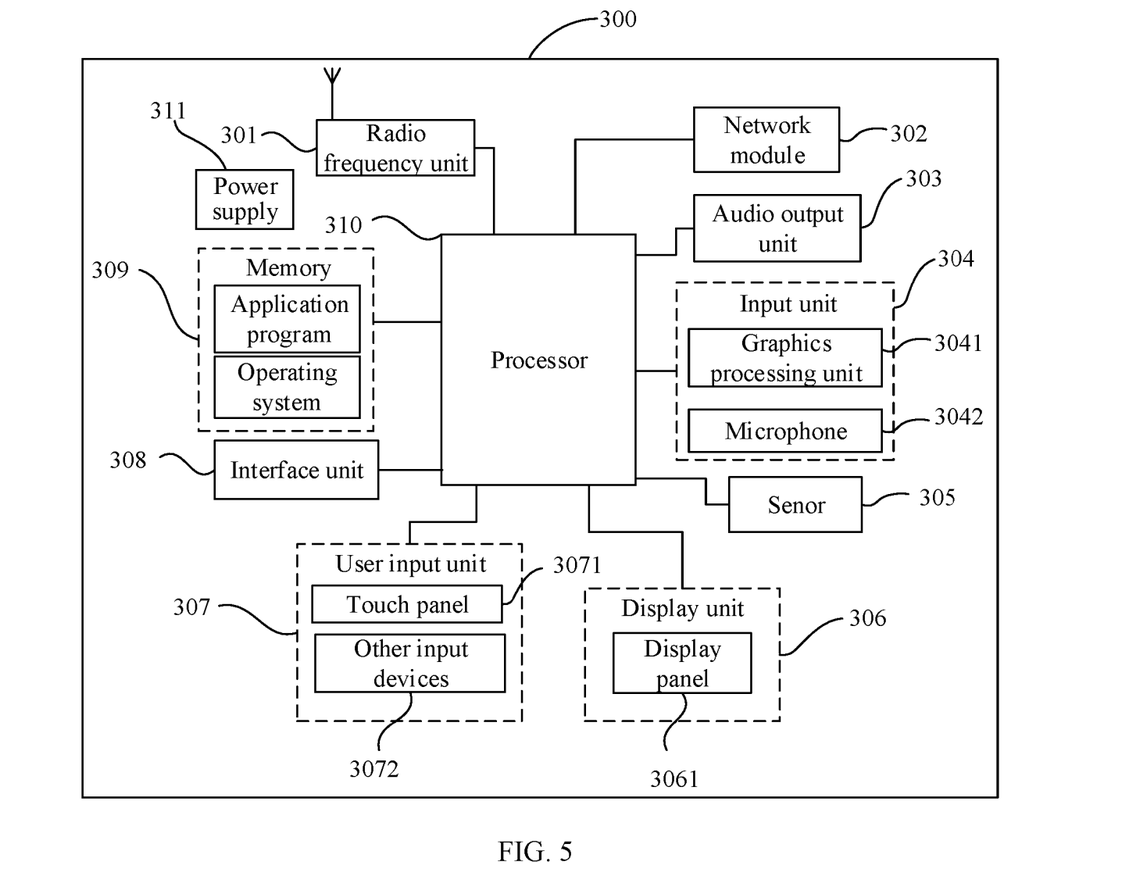
FIG. 5 is a schematic structural diagram of hardware of a remote terminal device according to an embodiment of this disclosure.

FIG. 5 is a schematic structural diagram of hardware of a remote terminal device according to an embodiment of this disclosure. The remote terminal device 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art may understand that the structure of the remote terminal device shown in FIG. 5 does not constitute any limitation on the remote terminal device. The remote terminal device may include more or fewer components than shown in the figure, or have some of the components combined or have the components arranged differently. In this embodiment of this disclosure, the remote terminal device includes but is not limited to a mobile phone, a tablet computer, a laptop computer, a personal digital assistant, an in-vehicle terminal, a wearable device, a pedometer, and the like.

The processor 310 may be configured to: perform a corresponding relay reselection operation in a case that a first relay reselection condition is met.

A process in which the processor 310 performs the corresponding relay reselection operation is basically the same as the process in which the remote terminal device performs the corresponding relay reselection operation in the foregoing method embodiment. For details, refer to the description in the foregoing method embodiment. Details are not described again in this embodiment of this disclosure.

It should be understood that in this embodiment of this disclosure, the radio frequency unit 301 may be configured to: receive and transmit signals in an information receiving/transmitting process or a call process; and specifically, after receiving downlink data from a base station, transmit the downlink data to the processor 310 for processing, and in addition, transmit uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may also communicate with a network and other devices via a wireless communications system.

The remote terminal device provides wireless broadband internet access for a user by using the network module 302, for example, helping the user send and receive e-mails, browse web pages, or access streaming media.

The audio output unit 303 may convert audio data received by the radio frequency unit 301 or the network module 302 or stored in the memory 309 into an audio signal and output the audio signal as a sound. In addition, the audio output unit 303 may also provide audio output (for example, a call signal received sound or a message received sound) related to a specific function performed by the remote terminal device 300. The audio output unit 303 includes a speaker, a buzzer, a telephone receiver, and the like.

The input unit 304 is configured to receive an audio or video signal. The input unit 304 may include a graphics processing unit (GPU) 3041 and a microphone 3042, and the graphics processing unit 3041 processes image data of a still picture or a video obtained by an image capture apparatus (for example, a camera) in an image capture mode or a video capture mode. A processed image frame may be displayed on the display unit 306. An image frame processed by the graphics processing unit 3041 may be stored in the memory 309 (or another storage medium) or sent by the radio frequency unit 301 or the network module 302. The microphone 3042 is capable of receiving sounds and processing such sounds into audio data. The processed audio data can be converted in a telephone call mode into a format that can be transmitted by the radio frequency unit 301 to a mobile communication base station, for outputting.

The remote terminal device 300 further includes at least one sensor 305, for example, an optical sensor, a motion sensor, and other sensors. Specifically, the optical sensor includes an ambient light sensor and a proximity sensor. The ambient light sensor may adjust brightness of a display panel 3061 based on intensity of ambient light. When the remote terminal device 300 moves near an ear, the proximity sensor may disable the display panel 3061 and/or backlight. As a type of motion sensor, an accelerometer sensor can detect magnitudes of accelerations in all directions (usually three axes), can detect a magnitude and a direction of gravity when being static, and can be applied to remote terminal device posture recognition (such as screen switching between portrait and landscape, related games, and magnetometer posture calibration), functions related to vibration recognition (such as a pedometer and tapping), and the like. The sensor 305 may also include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information input by the user or information provided to the user. The display unit 306 may include the display panel 3061. The display panel 3061 may be configured in a form of a liquid crystal display (LCD), an organic light-emitting diode (OLED), or the like.

The user input unit 307 may be configured to receive input digit or character information, and generate a key signal input related to user setting and function control of the remote terminal device. Specifically, the user input unit 307 includes a touch panel 3071 and other input devices 3072. The touch panel 3071, also referred to as a touchscreen, may capture a touch operation performed by the user on or near the touch panel (for example, an operation performed by the user on the touch panel 3071 or near the touch panel 3071 by using any appropriate object or accessory such as a finger or a stylus). The touch panel 3071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 310, and receives and executes a command sent by the processor 310. In addition, the touch panel 3071 may be implemented in a plurality of forms, for example, a resistive, capacitive, infrared, or surface acoustic wave touch panel. In addition to the touch panel 3071, the user input unit 307 may further include other input devices 3072. Specifically, the other input devices 3072 may include but are not limited to a physical keyboard, a function key (for example, a volume control key or an on/off key), a trackball, a mouse, and a joystick. Details are not described herein.

Further, the touch panel 3071 may cover the display panel 3061. When detecting a touch operation on or near the touch panel 3071, the touch panel 3071 transmits the touch operation to the processor 310 for determining a type of the touch event. Then, the processor 310 provides a corresponding visual output on the display panel 3061 based on the type of the touch event. In FIG. 5, the touch panel 3071 and the display panel 3061 serve as two separate components to implement input and output functions of the remote terminal device. However, in some embodiments, the touch panel 3071 and the display panel 3061 may be integrated to implement the input and output functions of the remote terminal device. This is not specifically limited herein.

The interface unit 308 is an interface for connecting an external apparatus to the remote terminal device 300. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 308 may be configured to receive an input (for example, data information or power) from an external apparatus and transmit the received input to one or more elements within the remote terminal device 300, or may be configured to transmit data between the remote terminal device 300 and the external apparatus.

The memory 309 may be configured to store software programs and various data. The memory 309 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 309 may include a high-speed random access memory, and may further include a non-volatile memory such as a disk storage device, a flash memory device, or another volatile solid-state storage device.

The processor 310 is a control center of the remote terminal device, uses various interfaces and lines to connect all parts of the entire remote terminal device, and performs various functions and data processing of the remote terminal device by running or executing the software program and/or module stored in the memory 309 and invoking data stored in the memory 309, thereby performing overall monitoring on the remote terminal device. The processor 310 may include one or more processing units. Optionally, the processor 310 may integrate an application processor and a modem processor. The application processor mainly processes an operating system, a user interface, an application program, and the like. The modem processor mainly processes wireless communication. It can be understood that the modem processor may alternatively be not integrated in the processor 310.

The remote terminal device 300 may further include the power supply 311 (for example, a battery) that supplies power to the components. Optionally, the power supply 311 may be logically connected to the processor 310 through a power management system, so as to implement functions such as charging management, discharging management, and power consumption management through the power management system.

In addition, the remote terminal device 300 includes some functional modules that are not shown. Details are not described herein.

Optionally, an embodiment of this disclosure further provides a remote terminal device, including a processor 310, a memory 309, and a computer program that is stored in the memory 309 and capable of running on the processor 310. When the computer program is executed by the processor 310, the processes of the relay reselection method applied to the remote terminal device provided in the embodiments of this disclosure are implemented, with the same technical effects achieved. To avoid repetition, details are not described herein again.

An embodiment of this disclosure further provides a computer-readable storage medium. The computer-readable storage medium stores a computer program instruction, and when the computer program instruction is executed by a processor, the processes of the relay reselection method applied to the remote terminal device provided in the embodiments of this disclosure are implemented, or the processes of the relay reselection method applied to a relay device according to the embodiments of this disclosure are implemented, with the same technical effects achieved. To avoid repetition, details are not described herein again. Examples of the computer-readable storage medium include a non-transitory computer-readable storage medium such as a read-only memory (ROM), a random access memory (RAM), a magnetic disk, or an optical disc.

The various aspects of this disclosure are described with reference to the flowcharts and/or block diagrams of the method, the device (system), and the computer program product according to the embodiments of this disclosure. It should be understood that each block in the flowcharts and/or block diagrams and combinations of blocks in the flowcharts and/or block diagrams can be implemented by computer program instructions. These computer program instructions can be provided to processors of a general-purpose computer, a special-purpose computer, or other programmable data processing device to produce a machine, so that the instructions executed by processors of a computer or other programmable data processing device enable implementation of functions/actions specified in one or more blocks of the flowcharts and/or block diagrams. Such a processor may be, but is not limited to, a general-purpose processor, a dedicated processor, a special application processor, or a field programmable logic circuit. It should be further understood that each block in the block diagrams and/or the flowcharts and a combination of the blocks in the block diagrams and/or the flowcharts may also be implemented by a dedicated hardware for executing a specified function or action, or may be implemented by a combination of dedicated hardware and computer instructions.

It should be noted that although the foregoing embodiments have been described in this specification, the patent protection scope of this disclosure is not limited thereto. Therefore, changes and modifications made to the embodiments described herein based on the innovative ideas of this disclosure, equivalent structure or process transformations made by using the content of the specification and drawings of this disclosure, or the above technical solutions directly or indirectly applied to other related technical fields are all included in the patent protection scope of this disclosure.

What is claimed is:

1. A relay reselection method applied to a first device, wherein the method comprises:
    performing a corresponding relay reselection operation in a case that a first relay reselection condition is met,
    wherein in a case that the first device is a relay device, and the performing a corresponding relay reselection operation comprises: notifying, by the relay device, a remote terminal device to perform relay reselection, wherein the first relay reselection condition of the relay device comprises: the relay device on a communication link between the relay device and a network-side device have been switched; wherein the notifying, by the relay device, a remote terminal device to perform relay reselection comprises: transmitting, to the remote terminal device, a radio resource control message for instructing the remote terminal device to perform relay reselection; wherein the first relay reselection condition of the relay device further comprises: the relay device having detected a beam failure on a communication link; and the first relay reselection condition of the relay device further comprises at least one of the following: a beam failure recovery timer started by the relay device having expired, a random access procedure for beam failure recovery triggered by the relay device having failed, the relay device having started a beam failure recovery timer, the relay device having triggered a random access procedure for beam failure recovery, the relay device having started a beam failure detection timer, a beam failure detection timer started by the relay device having expired, and a count value of a beam failure instance counter being greater than a preset count value;
    in a case that the first device is a remote terminal device, and the performing a corresponding relay reselection operation comprises: performing relay reselection, wherein the first relay reselection condition of the remote terminal device comprises: the remote terminal device having detected a radio link failure on a communication link between the remote terminal device and the relay device; wherein the first relay reselection condition of the remote terminal device further comprises at least one of the following:
    the remote terminal device having detected a beam failure on a communication link between the remote terminal device and a relay device;
    the remote terminal device having received no reference signal for radio link monitoring from the relay device within preset first duration;
    the remote terminal device having received no service data from the relay device within preset second duration;
    the remote terminal device having received no feedback message from the relay device within preset third duration; and
    the remote terminal device having received no sidelink discovery signal from the relay device within preset fourth duration.

2. The method according to claim 1, wherein the notifying a remote terminal device to perform relay reselection further comprises at least one of the following:
    transmitting no reference signal for radio link monitoring on a communication link with the remote terminal device;
    transmitting no service data on a communication link with the remote terminal device;
    transmitting no feedback message on a communication link with the remote terminal device; and
    transmitting no sidelink discovery signal on a communication link with the remote terminal device.

3. The method according to claim 2, wherein the radio resource control message comprises at least one of the following:
    a radio resource control release message, a radio resource control reconfiguration message, a radio resource control connection establishment reject message, and other radio resource control messages than the radio resource control release message, the radio resource control reconfiguration message, and the radio resource control connection establishment reject message;

second indication information, wherein the second indication information is used to indicate a relay reselection condition satisfied by the relay device.

4. The method according to claim 1, wherein the first relay reselection condition of the relay device further comprises at least one of the following:
   the relay device having detected a radio link failure on a communication link;
   the relay device having performed a radio resource control connection reestablishment on a communication link between the relay device and the network-side device;
   the relay device having received first indication information transmitted by the network-side device, wherein the first indication information is used to indicate the relay device to perform the corresponding relay reselection operation; and
   the relay device having not satisfied a first condition, wherein the first condition is a condition for serving as a relay.

5. The method according to claim 4, wherein the first condition comprises at least one of the following:
   at least one beam measurement result measured by the relay device in a serving cell being greater than a first preset beam measurement result;
   at least one beam measurement result measured by the relay device in a serving cell being smaller than a second preset beam measurement result.

6. The method according to claim 4, wherein the relay device having detected a beam failure on a communication link comprises at least one of the following:
   the relay device having detected a beam failure on a communication link between the relay device and the remote terminal device;
   the relay device having detected a beam failure on a communication link between the relay device and the network-side device.

7. The method according to claim 4, wherein the relay device having detected a radio link failure on a communication link comprises at least one of the following:
   the relay device having detected a radio link failure on a communication link between the relay device and the remote terminal device;
   the relay device having detected a radio link failure on a communication link between the relay device and the network-side device.

8. The method according to claim 1, wherein the radio resource control message comprises third indication information, or at least one of the following:
   a radio resource control release message, a radio resource control reconfiguration message, a radio resource control connection establishment reject message, and other radio resource control messages than the radio resource control release message, the radio resource control reconfiguration message, and the radio resource control connection establishment reject message;
   wherein the third indication information is used to indicate a relay reselection condition satisfied by the relay device.

9. A device, comprising a memory, a processor, and a computer program that is stored in the memory and capable of running on the processor, wherein
   when the processor executes the computer program, the following step is implemented:
   performing a corresponding relay reselection operation in a case that a first relay reselection condition is met,
   wherein in a case that the device is a relay device, and the performing a corresponding relay reselection operation comprises: notifying a remote terminal device to perform relay reselection, wherein the first relay reselection condition of the relay device comprises: the relay device on a communication link between the relay device and a network-side device having been switched; wherein the notifying, by the relay device, a remote terminal device to perform relay reselection comprises: transmitting, to the remote terminal device, a radio resource control message for instructing the remote terminal device to perform relay reselection; wherein the first relay reselection condition of the relay device further comprises: the relay device having detected a beam failure on a communication link; and the first relay reselection condition of the relay device further comprises at least one of the following: a beam failure recovery timer started by the relay device having expired, a random access procedure for beam failure recovery triggered by the relay device having failed, the relay device having started a beam failure recovery timer, the relay device having triggered a random access procedure for beam failure recovery, the relay device having started a beam failure detection timer, a beam failure detection timer started by the relay device having expired, and a count value of a beam failure instance counter being greater than a preset count value;
   in a case that the device is a remote terminal device, and the performing a corresponding relay reselection operation comprises: performing relay reselection, wherein the first relay reselection condition of the remote terminal device comprises: the remote terminal device having detected a radio link failure on a communication link between the remote terminal device and the relay device; wherein the first relay reselection condition of the remote terminal device further comprises at least one of the following:
   the remote terminal device having detected a beam failure on a communication link between the remote terminal device and a relay device;
   the remote terminal device having received no reference signal for radio link monitoring from the relay device within preset first duration;
   the remote terminal device having received no service data from the relay device within preset second duration;
   the remote terminal device having received no feedback message from the relay device within preset third duration; and
   the remote terminal device having received no sidelink discovery signal from the relay device within preset fourth duration.

10. The device according to claim 9, wherein the first relay reselection condition of the relay device further comprises at least one of the following:
   the relay device having detected a radio link failure on a communication link;
   the relay device having performed a radio resource control connection reestablishment on a communication link between the relay device and the network-side device;
   the relay device having received first indication information transmitted by the network-side device, wherein the first indication information is used to indicate the relay device to perform the corresponding relay reselection operation; and the relay device having not satisfied a first condition, wherein the first condition is a condition for serving as a relay.

11. The device according to claim 10, wherein the relay device having detected a radio link failure on a communication link comprises at least one of the following:
the relay device having detected a radio link failure on a communication link between the relay device and the remote terminal device;
the relay device having detected a radio link failure on a communication link between the relay device and the network-side device.

12. A non-transitory computer-readable storage medium, wherein the non-transitory computer-readable storage medium stores a computer program, and the computer program is executed by a processor to perform the following steps:
performing, by a first device, a corresponding relay reselection operation in a case that a first relay reselection condition is met,
wherein in a case that the first device is a relay device, and the performing a corresponding relay reselection operation comprises: notifying, by the relay device, a remote terminal device to perform relay reselection, wherein the first relay reselection condition of the relay device comprises: the relay device on a communication link between the relay device and a network-side device have been switched; wherein the notifying, by the relay device, a remote terminal device to perform relay reselection comprises: transmitting, to the remote terminal device, a radio resource control message for instructing the remote terminal device to perform relay reselection; wherein the first relay reselection condition of the relay device further comprises: the relay device having detected a beam failure on a communication link; and the first relay reselection condition of the relay device further comprises at least one of the following: a beam failure recovery timer started by the relay device having expired, a random access procedure for beam failure recovery triggered by the relay device having failed, the relay device having started a beam failure recovery timer, the relay device having triggered a random access procedure for beam failure recovery, the relay device having started a beam failure detection timer, a beam failure detection timer started by the relay device having expired, and a count value of a beam failure instance counter being greater than a preset count value;
in a case that the first device is a remote terminal device, and the performing a corresponding relay reselection operation comprises: performing relay reselection, wherein the first relay reselection condition of the remote terminal device comprises: the remote terminal device having detected a radio link failure on a communication link between the remote terminal device and the relay device; wherein the first relay reselection condition of the remote terminal device further comprises at least one of the following:
the remote terminal device having detected a beam failure on a communication link between the remote terminal device and a relay device;
the remote terminal device having received no reference signal for radio link monitoring from the relay device within preset first duration;
the remote terminal device having received no service data from the relay device within preset second duration;
the remote terminal device having received no feedback message from the relay device within preset third duration; and
the remote terminal device having received no sidelink discovery signal from the relay device within preset fourth duration.

13. The non-transitory computer-readable storage medium according to claim 12, wherein the notifying a remote terminal device to perform relay reselection further comprises at least one of the following:
transmitting no reference signal for radio link monitoring on a communication link with the remote terminal device;
transmitting no service data on a communication link with the remote terminal device;
transmitting no feedback message on a communication link with the remote terminal device; and
transmitting no sidelink discovery signal on a communication link with the remote terminal device.

14. The non-transitory computer-readable storage medium according to claim 12, wherein the first relay reselection condition of the relay device further comprises at least one of the following:
the relay device having detected a radio link failure on a communication link;
the relay device having performed a radio resource control connection reestablishment on a communication link between the relay device and the network-side device;
the relay device having received first indication information transmitted by the network-side device, wherein the first indication information is used to indicate the relay device to perform the corresponding relay reselection operation; and
the relay device having not satisfied a first condition, wherein the first condition is a condition for serving as a relay.

* * * * *